US012011897B2

(12) United States Patent
Katada

(10) Patent No.: US 12,011,897 B2
(45) Date of Patent: Jun. 18, 2024

(54) FILM PROCESSING DEVICE, BAG MANUFACTURING DEVICE, METHOD FOR PROCESSING FILM, AND METHOD FOR MANUFACTURING BAG

(71) Applicant: IDEMITSU UNITECH CO., LTD., Tokyo (JP)

(72) Inventor: Ryo Katada, Tokyo (JP)

(73) Assignee: IDEMITSU UNITECH CO., LTD., Tokyo (JP)

( * ) Notice: Subject to any disclaimer, the term of this patent is extended or adjusted under 35 U.S.C. 154(b) by 103 days.

(21) Appl. No.: 17/780,679

(22) PCT Filed: Nov. 18, 2020

(86) PCT No.: PCT/JP2020/042975
§ 371 (c)(1),
(2) Date: May 27, 2022

(87) PCT Pub. No.: WO2021/106709
PCT Pub. Date: Jun. 3, 2021

(65) Prior Publication Data

US 2023/0133660 A1 May 4, 2023

(30) Foreign Application Priority Data

Nov. 29, 2019 (JP) ................................ 2019-216454

(51) Int. Cl.
*B31B 70/14* (2017.01)
*B31B 70/16* (2017.01)
(Continued)

(52) U.S. Cl.
CPC ........... *B31B 70/142* (2017.08); *B31B 70/16* (2017.08); *B31B 70/84* (2017.08); *B31B 2155/00* (2017.08)

(58) Field of Classification Search
CPC ... B31B 70/142; B31B 70/16; B65D 33/2533; B65D 33/2583; B65D 33/2508; B65D 33/002
(Continued)

(56) References Cited

U.S. PATENT DOCUMENTS 5,078,311 A 1/1992 Taguchi et al.
10,370,154 B2 8/2019 Ozaki et al.
(Continued)

FOREIGN PATENT DOCUMENTS

CN 102975317 A 3/2013
CN 206898217 U 1/2018
(Continued)

OTHER PUBLICATIONS

International Search Report PCT/2020/042975 dated Jan. 12, 2021 (pp. 1-3).
(Continued)

*Primary Examiner* — Jacob A Smith
(74) *Attorney, Agent, or Firm* — Millen, White, Zelano & Branigan, P.C.; Ryan R. Pool

(57) ABSTRACT

Provided is a film processing device including: a first cutting blade and a first receiver base that are opposed to each other with a film including at least two layers interposed therebetween, and are configured to move toward and away from each other; and a first distance adjuster that adjusts, without being in contact with the film, a minimum distance between the first cutting blade and the first receiver base.

14 Claims, 8 Drawing Sheets

(51) Int. Cl.
*B31B 70/84* (2017.01)
*B31B 155/00* (2017.01)

(58) Field of Classification Search
USPC .......................................................... 493/228
See application file for complete search history.

(56) References Cited

U.S. PATENT DOCUMENTS

| | | | |
|---|---|---|---|
| 11,649,090 | B2 | 5/2023 | Todaka et al. |
| 11,845,589 | B2 | 12/2023 | Namba et al. |
| 2012/0270004 | A1 | 10/2012 | Gluck |
| 2020/0231339 | A1 | 7/2020 | Katada |

FOREIGN PATENT DOCUMENTS

| | | | | | |
|---|---|---|---|---|---|
| EP | 0352634 | A2 | | 1/1990 | |
| EP | 3351128 | A1 | | 7/2018 | |
| JP | H10296698 | A | | 11/1998 | |
| JP | 2006000979 | A | | 1/2006 | |
| JP | 2009255183 | A | * | 11/2009 | ................ B26F 1/00 |
| JP | 2009255183 | A | | 11/2009 | |
| JP | 2015009333 | A | | 1/2015 | |
| JP | 2015009333 | A | * | 1/2015 | ................ B26F 1/00 |
| JP | 2018002284 | A | | 1/2018 | |
| JP | 2018176437 | A | | 11/2018 | |
| JP | 2018176437 | A | * | 11/2018 | ............. B31B 70/81 |
| JP | 2019051963 | A2 | | 4/2019 | |
| WO | 2018207631 | A1 | | 11/2018 | |

OTHER PUBLICATIONS

Search Report issued in corresponding European patent application No. 20893078.4 on Jan. 31, 2024 (pp. 1-7).
Office Action in corresponding CN application No. 202080081007.4 dated May 7, 2024 (pp. 1-12).

* cited by examiner

FILM PROCESSING DEVICE, BAG MANUFACTURING DEVICE, METHOD FOR PROCESSING FILM, AND METHOD FOR MANUFACTURING BAG

TECHNICAL FIELD

The present invention relates to a film processing device, a bag manufacturing device, a method for processing a film, and a method for manufacturing a bag.

BACKGROUND ART

A technique for forming a tab for unsealing a bag has been known. For example, Patent Literature 1 discloses a technique in which a cutting device that forms a tab in a film of a bag base material includes, in addition to a cutting blade and a receiver base, a spacer member that is disposed between a first film and a second film. This prevents, when forming a tab in the first film, the tab from being extended to the second film due to passing through of the cutting blade and reliably forms a so-called half-cut.

CITATION LIST

Patent Literature

Patent Literature 1: JP 2018-176437 A

SUMMARY OF THE INVENTION

Problems to be Solved by the Invention

However, since the cutting blade in the technique described in Patent Literature 1 comes into contact with the spacer member, the cutting blade is easily worn. Further, processing includes many steps and is complicated. Furthermore, in order to interpose the spacer member between films, a cut for a tab is required to be formed prior to forming a seal region around the tab. Thus, the cut may be fusion-bonded due to heat of heat sealing during forming the seal region.

Accordingly, an object of the invention is to provide a film processing device, a bag manufacturing device, a method for processing a film, and a method for manufacturing a bag, which are able to reduce abrasion of a cutting blade when forming a half-cut in a film and to improve manufacturing efficiency by simplifying steps of processing.

Means for Solving the Problems

[1] A film processing device including: a first cutting blade and a first receiver base that are opposed to each other with a film including at least two layers interposed therebetween, and are configured to move toward and away from each other; and a first distance adjuster that adjusts, without being in contact with the film, a minimum distance between the first cutting blade and the first receiver base.

[2] The film processing device according to [1], further including: a second cutting blade and a second receiver base that are opposed to each other with the film interposed therebetween at a position that is different from a position where the first cutting blade and the first receiver base face each other, and are configured to move toward and away from each other; and a second distance adjuster that adjusts, without being in contact with the film, a minimum distance between the second cutting blade and the second receiver base, in which the second cutting blade and the second receiver base are arranged invertedly from the first cutting blade and the first receiver base with respect to the film.

[3] The film processing device according to [2], in which, when the first cutting blade and the first receiver base have moved toward each other to a minimum distance and the second cutting blade and the second receiver base have moved toward each other to a minimum distance, the first cutting blade and the second cutting blade overlap with each other in a thickness direction of the film.

[4] The film processing device according to [3], in which the film has a first surface and a second surface that are overlapped with each other, with a tearing strip and a base strip of a zipper tape interposed between the first surface and the second surface, the minimum distance between the first cutting blade and the first receiver base is adjusted in such a manner as to cut the first surface, the tearing strip, and the base strip, and not to cut the second surface, and the minimum distance between the second cutting blade and the second receiver base is adjusted in such a manner as to cut the second surface and the base strip, and not to cut the first surface and the tearing strip.

[5] The film processing device according to [4], in which the film further has a third surface and a fourth surface that are folded in between the first surface and the second surface, the tearing strip and the base strip are interposed between the first surface and the third surface, the minimum distance between the first cutting blade and the first receiver base is adjusted in such a manner as to cut the first surface, the tearing strip, the base strip, and the third surface, and not to cut the fourth surface and the second surface, and the minimum distance between the second cutting blade and the second receiver base is adjusted in such a manner as to cut the second surface, the fourth surface, the third surface, and the base strip, and not to cut the first surface and the tearing strip.

[6] The film processing device according to any one of [2] to [5], in which the first cutting blade and the second receiver base are attached to a common drive mechanism that is included in the first distance adjuster and in the second distance adjuster, and the first receiver base and the second cutting blade are supported by a table that is included in the first distance adjuster and in the second distance adjuster, the table being on an opposite side of the drive mechanism with the film interposed therebetween.

[7] A bag manufacturing device including the film processing device according to any one of [1] to [6], the bag manufacturing device further including a sealing device that forms a seal portion having a surrounding shape where the film is sealed, in a portion of the bag, in which the first cutting blade and the first receiver base form a tab in a region surrounded by the seal portion.

[8] A bag manufacturing device including the film processing device according to [5], the bag manufacturing device further including a sealing device that forms a seal portion where the first surface and the third surface are sealed to each other, in a portion of the bag, in which the first cutting blade and the first receiver base form a tab in the seal portion.

[9] A method for processing a film, the method including forming a first cut in a film including at least two layers by using a first cutting blade and a first receiver base, the first cutting blade and the first receiver base being opposed to each other with the film interposed therebetween, in which a minimum distance between the first cutting blade and the first receiver base is adjusted by a first distance adjuster which is not in contact with the film.

[10] The method for processing the film according to [9], further including forming a second cut in the film from a side opposite to the first cut by using a second cutting blade and a second receiver base, the second cutting blade and the second receiver base being opposed to each other with the film interposed therebetween at a position that is different from a position where the first cutting blade and the first receiver base face each other, in which a minimum distance between the second cutting blade and the second receiver base is adjusted by a second distance adjuster which is not in contact with the film.

[11] The method for processing the film according to [10], in which the first cut and the second cut overlap with each other in a thickness direction of the film.

[12] The method for processing the film according to [11], in which the film has a first surface and a second surface that are overlapped with each other, with a tearing strip and a base strip of a zipper tape interposed between the first surface and the second surface, the first cut is formed in the first surface, the tearing strip, and the base strip, and is not formed in the second surface, and the second cut is formed in the second surface and the base strip, and is not formed in the first surface and the tearing strip.

[13] The method for processing the film according to [12], in which the film further has a third surface and a fourth surface that are folded in between the first surface and the second surface, the tearing strip and the base strip are interposed between the first surface and the third surface, the first cut is formed in the first surface, the tearing strip, the base strip, and the third surface, and is not formed in the fourth surface and the second surface, and the second cut is formed in the second surface, the fourth surface, the third surface, and the base strip, and is not formed in the first surface and the tearing strip.

[14] The method for processing the film according to any one of [10] to [13], in which the first cutting blade and the second receiver base are attached to a common drive mechanism that is included in the first distance adjuster and in the second distance adjuster, and the first cut and the second cut are formed by reciprocating motion of the common drive mechanism.

[15] A method for manufacturing a bag including the steps of the method for processing the film according to any one of [9] to [14], the method for manufacturing the bag further including: forming a tab by means of the first cut in the bag; and forming a seal portion where the film is sealed in a region surrounding the tab.

[16 ] A method for manufacturing a bag including the steps of the method for processing the film according to [13], the method for manufacturing the bag further including forming a seal portion where the first surface and the third surface are sealed in a portion of the bag, in which a tab is formed by means of the first cut in the seal portion.

According to the above-described configurations, the minimum distance between the cutting blade and the receiver base is adjusted by the distance adjuster that is not in contact with the film. This makes it possible to reduce abrasion of the cutting blade when forming a half-cut in the film and to improve manufacturing efficiency by simplifying steps of processing.

DESCRIPTION OF EMBODIMENT(S)

The following describes preferred exemplary embodiments of the invention in detail with reference to the accompanying drawings. It is to be noted that, in the specification and the accompanying drawings, components that have substantially the same functional configuration are indicated by the same codes, and thus redundant description thereof is omitted.

First Exemplary Embodiment

Figure 1:
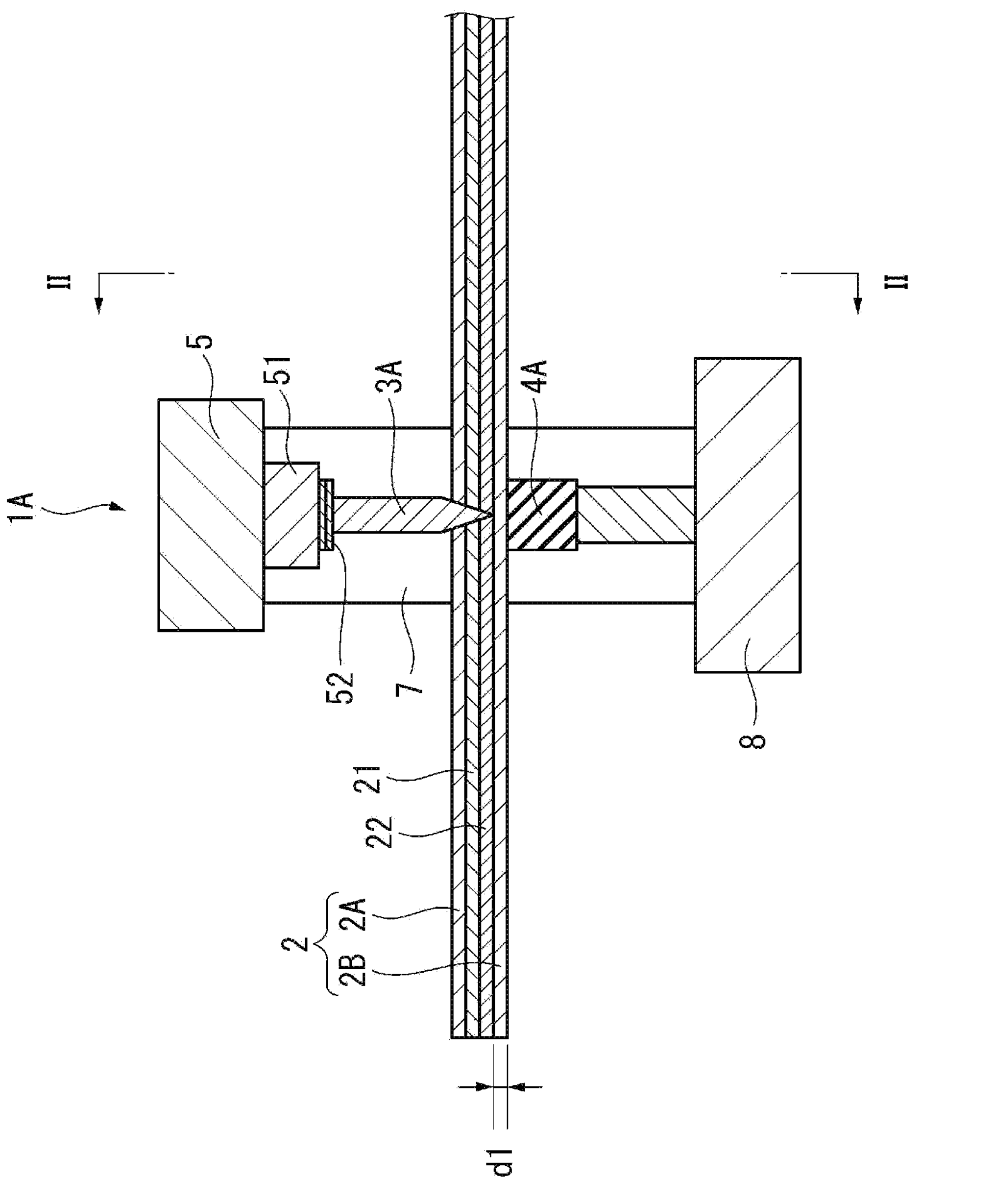
FIG. 1 is a diagram illustrating a schematic configuration of a film processing device according to a first exemplary embodiment of the invention.
Figure 2:
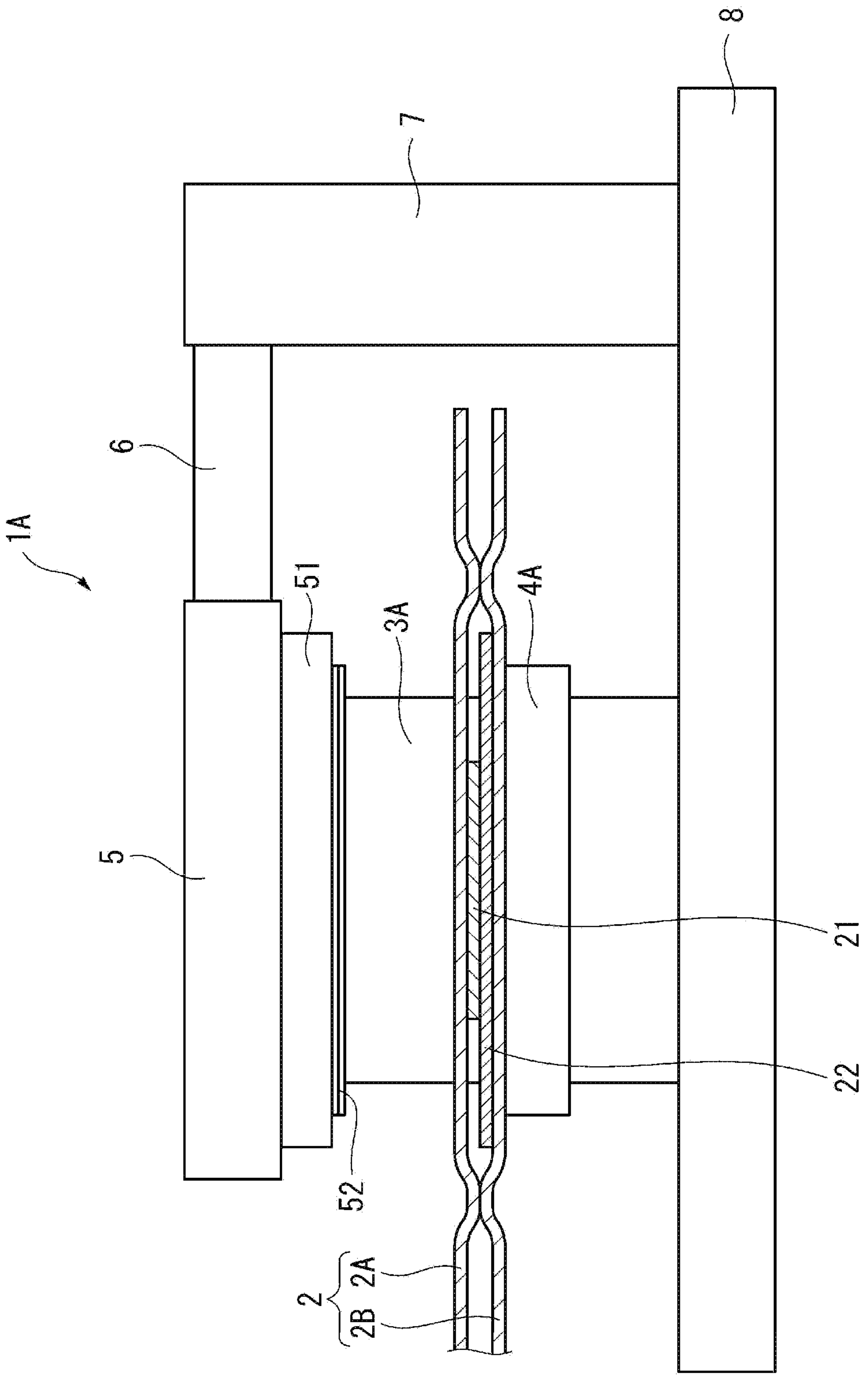
FIG. 2 is an arrow view taken along a line II-II of FIG. 1.

FIG. 1 is a diagram illustrating a schematic configuration of a film processing device according to a first exemplary embodiment of the invention. FIG. 2 is an arrow view taken along a line II-II of FIG. 1. In the illustrated example, a processing device 1A includes: a cutting blade 3A and a receiver base 4A opposed to each other with a film 2 interposed therebetween; a drive mechanism 5 to which the cutting blade 3A is attached via a holder 51; an arm 6 that supports the drive mechanism 5; a post 7 that supports the support arm 6; and a table 8 that supports the post 7 and the receiver base 4A. The cutting blade 3A and the receiver base 4A move toward and away from each other by reciprocating motion of the drive mechanism 5 within a predetermined range of movement in a vertical direction with the arm 6 as a fulcrum.

Here, a minimum distance d1 between the cutting blade 3A and the receiver base 4A, i.e., a distance between a tip of the cutting blade 3A and a surface of the receiver base 4A when the cutting blade 3A is closest to the receiver base 4A, is variable by means of a shim 52 interposed between the cutting blade 3A and the holder 51. That is, in the exemplary embodiment, the drive mechanism 5 including the holder 51 and the shim 52, the arm 6, the post 7, and the table 8 configure a distance adjuster that adjusts the minimum distance d1 between the cutting blade 3A and the receiver base 4A. As illustrated in FIG. 2, the distance adjuster is C-shaped in cross section as a whole, and thus is not in contact with the film 2.

In the exemplary embodiment, the film 2 has two surfaces 2A and 2B that are overlapped with each other, with a tearing strip 21 and a base strip 22 of a zipper tape interposed between the surfaces 2A and 2B. The processing device 1A adjusts the minimum distance d1 between the cutting blade 3A and the receiver base 4A in such a manner as to cut the surface 2A, the tearing strip 21, and the base strip 22, and not to cut the surface 2B. Specifically, the minimum distance d1 corresponds to a thickness of the surface 2B. This allows the processing device 1A to form a cut (half-cut) that is obtained by cutting only some of the layers of a multi-layer structure in which the film 2, the tearing strip 21, and the base strip 22 are overlapped with each other.

Figure 3:
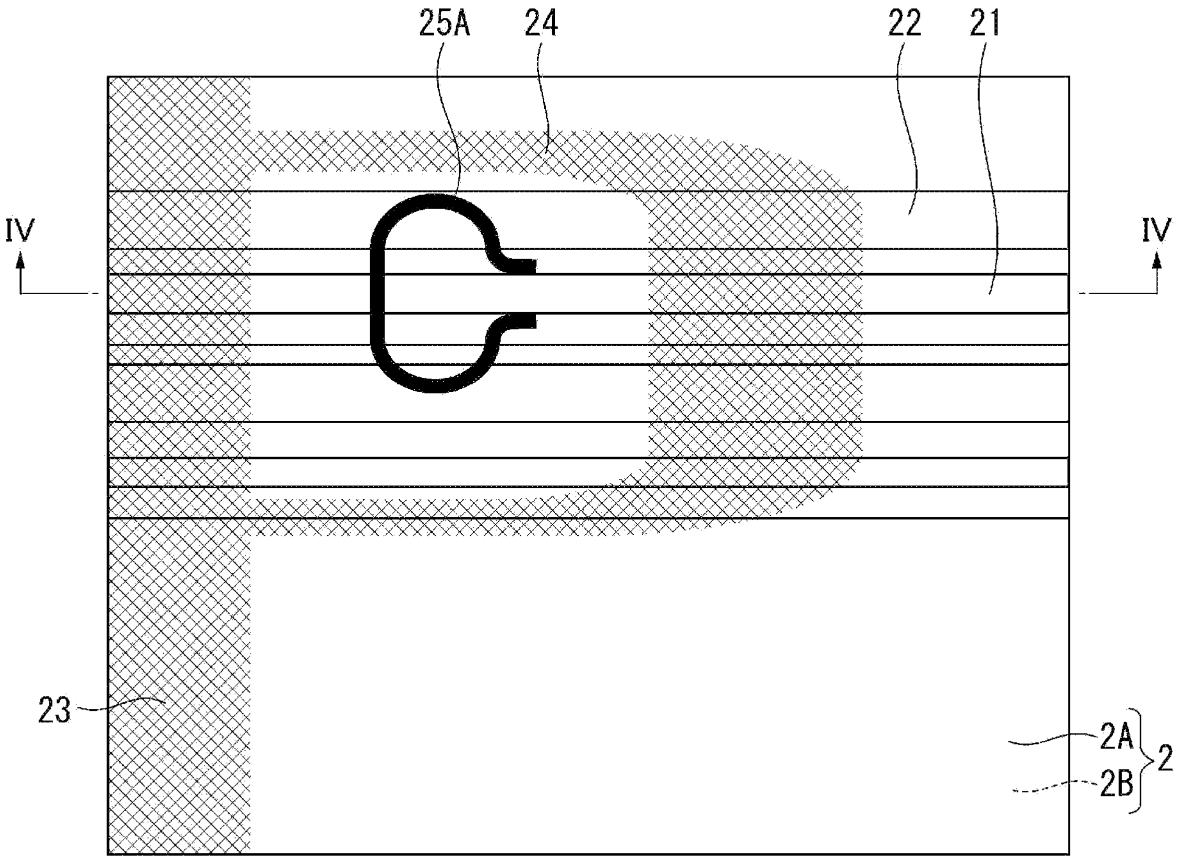
FIG. 3 is a partial plan view of a bag to be manufactured using a film which has been processed in the first exemplary embodiment of the invention.
Figure 4:
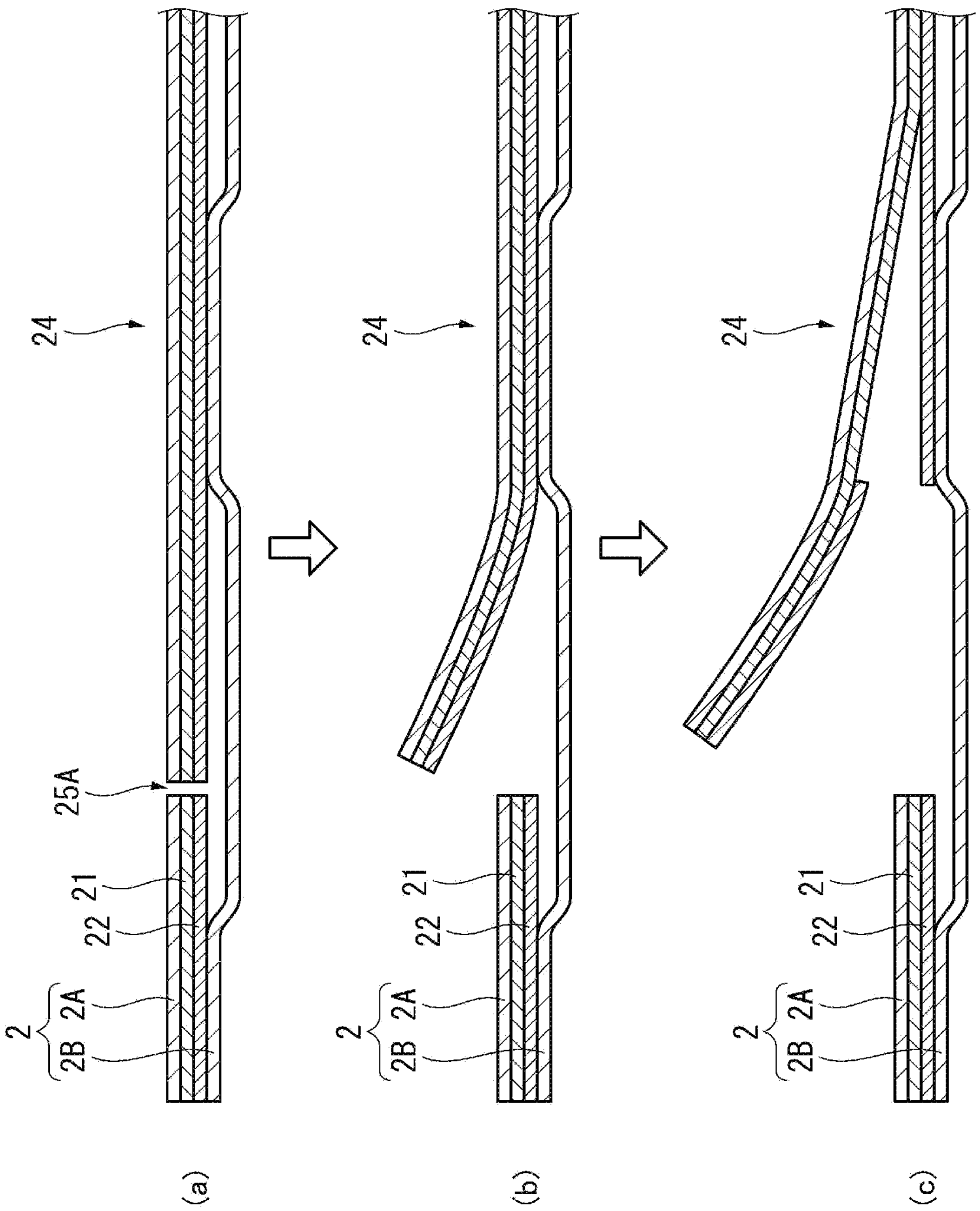
FIG. 4 is a cross-sectional view taken along a line IV-IV of FIG. 3.

FIG. 3 is a partial plan view of a bag to be manufactured using a film which has been processed in the first exemplary embodiment of the invention. FIG. 4 is a cross-sectional view taken along a line IV-IV of FIG. 3. A cross-sectional direction of FIG. 4 is the same as that of FIG. 1; however, FIG. 4 illustrates an unbonded portion as a space. In the illustrated example, a sealing device which is provided separately from the processing device 1A seals the surfaces 2A and 2B of the film 2 to each other at a side seal portion 23 and a surrounding seal portion 24. As illustrated in the figure, a portion of the side seal portion 23 and the surrounding seal portion 24 form a seal portion having a surrounding shape. The processing device 1A forms a tab by means of a cut 25A in a region surrounded by the side seal portion 23 and the surrounding seal portion 24. In this case, either the forming of the side seal portion 23 and the surrounding seal portion 24 or the forming of the tab by means of the cut 25A may be performed first; however, it is preferable that the forming of the seal portions be performed first in order to prevent fusion-bonding of the cut due to heat of heat sealing, as described below.

As illustrated in (a) of FIG. 4, the cut 25A passes through the surface 2A, the tearing strip 21, and the base strip 22. Thus, as illustrated in (b) of FIG. 4, a user is able to lift the above-described three layers from a surface 2A side using the tab formed by means of the cut 25A as a starting point. When the user holds and pulls the tab, as illustrated in (c) of FIG. 4, the base strip 22 breaks at the surrounding seal portion 24, and only the surface 2A is torn along the tearing strip 21, thereby unsealing the bag. Such a bag is described in, for example, Japanese Unexamined Patent Application Publication No. 2019-051963, and thus further detailed description of the bag is omitted.

According to the first exemplary embodiment of the invention described above, the distance adjuster that is not in contact with the film 2 adjusts the minimum distance d1 between the cutting blade 3A and the receiver base 4A. The distance adjuster is disposed in such a manner as not to be in contact with the film 2. The cutting blade thus does not come into contact with the distance adjuster unlike a case of interposing a spacer member as a distance adjuster between films, for example. Accordingly, it is possible to reduce abrasion of the cutting blade and to improve manufacturing efficiency by simplifying steps of processing. Further, the distance adjuster does not come into contact with the film 2, which makes it possible to form the cut by the processing device 1A after a seal region as illustrated in FIG. 3 is formed by heat sealing, for example. This prevents fusion-bonding of the cut due to the heat of the heat sealing.

In the example described above, the drive mechanism 5 disposed on a cutting blade 3A side, the arm 6, the post 7, and the table 8 configure the distance adjuster; however, the distance adjuster may not necessarily include portions referred to as arm, post, and table. Regardless of a specific shape of a member, a C-shaped, box-shaped, or portal-shaped frame that supports the cutting blade 3A and the receiver base 4A and is disposed to surround the film 2 as a whole may be used as the distance adjuster according to an exemplary embodiment of the invention. Although the shim 52 is exemplified as a component included in the distance adjuster for varying the distance, the distance may also be varied by using various methods available as a linear position adjuster such as a ball screw. The drive mechanism 5 may not necessarily be disposed on the cutting blade 3A side, and may be disposed on a receiver base 4A side, for example.

Second Exemplary Embodiment

Figure 5:
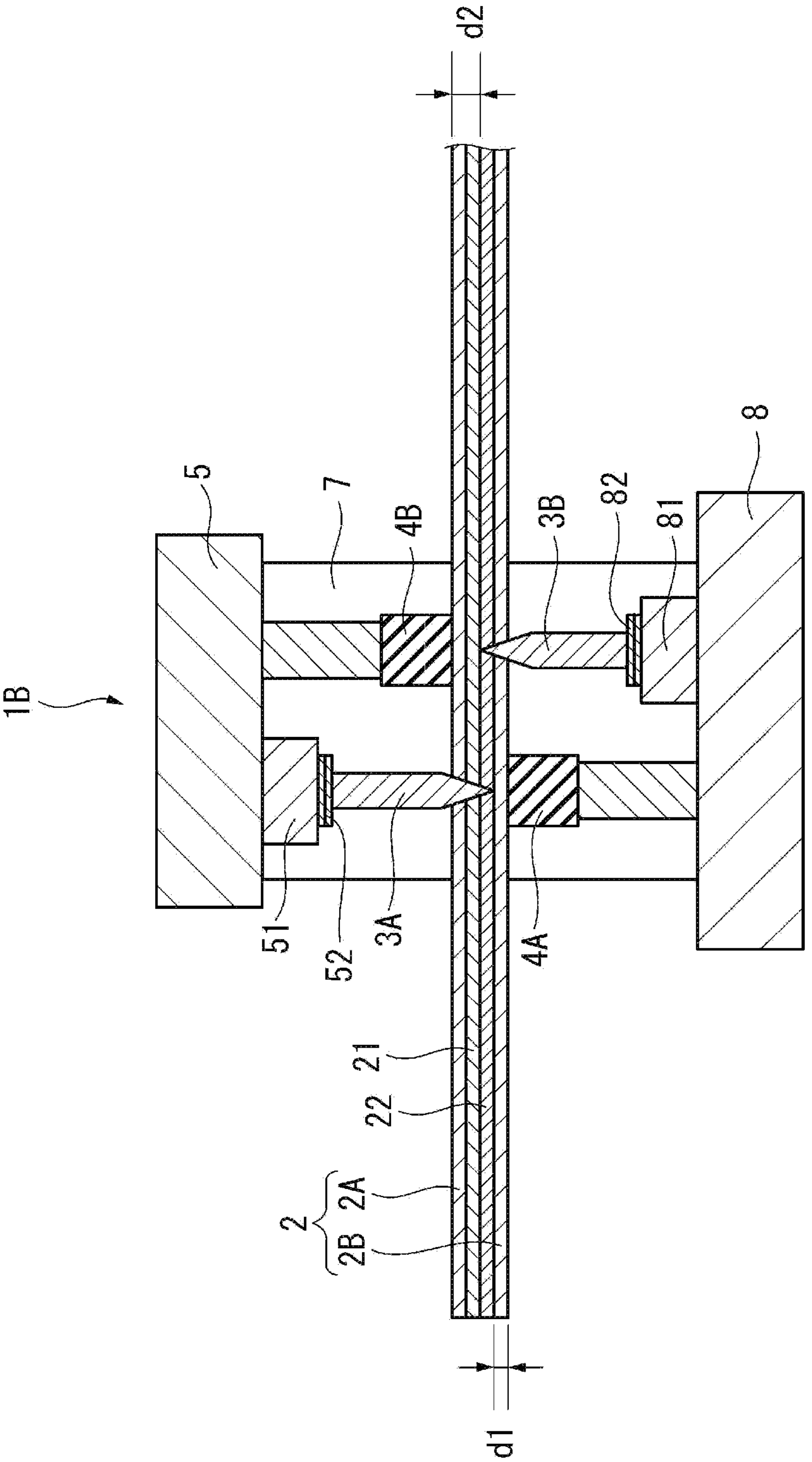
FIG. 5 is a diagram illustrating a schematic configuration of a film processing device according to a second exemplary embodiment of the invention.

FIG. 5 is a diagram illustrating a schematic configuration of a film processing device according to a second exemplary embodiment of the invention. The configuration of the exemplary embodiment is similar to that of the above-described first exemplary embodiment except for the following points, and thus redundant and detailed description thereof is omitted. In the illustrated example, a processing device 1B includes, in addition to the cutting blade 3A, the receiver base 4A, the drive mechanism 5, the arm 6, the post 7, and the table 8 described above, a cutting blade 3B and a receiver base 4B opposed to each other with the film 2 interposed therebetween. The cutting blade 3B and the receiver base 4B face each other at a position different from a position where the cutting blade 3A and the receiver base 4A face each other. The cutting blade 3B and the receiver base 4B are arranged invertedly from the cutting blade 3A and the receiver base 4A with respect to the film 2. Thus, in the exemplary embodiment, the cutting blade 3B is supported by the table 8 via a holder 81, and the receiver base 4B is attached to the drive mechanism 5. In other words, the cutting blade 3A and the receiver base 4A move toward and away from each other by the reciprocating motion of the cutting blade 3A by the drive mechanism 5, whereas the cutting blade 3B and the receiver base 4B move toward and away from each other by the reciprocating motion of the receiver base 4B by the drive mechanism 5.

Here, a minimum distance d2 between the cutting blade 3B and the receiver base 4B, i.e., a distance between a tip of the cutting blade 3B and a surface of the receiver base 4B when the cutting blade 3B is closest to the receiver base 4B, is variable by means of a shim 82 interposed between the cutting blade 3B and the holder 81. That is, in the exemplary embodiment, the drive mechanism 5, the arm 6, the post 7, and the table 8 including the holder 81 and the shim 82 configure a distance adjuster that adjusts the minimum distance d2 between the cutting blade 3B and the receiver base 4B. In the exemplary embodiment, the first distance adjuster that adjusts the minimum distance d1 between the cutting blade 3A and the receiver base 4A and the second distance adjuster that adjusts the minimum distance d2 between the cutting blade 3B and the receiver base 4B include the followings in common: a body part of the drive mechanism 5; the arm 6; the post 7; and a body part of the table 8. As with the example of FIG. 2, the first distance adjuster and the second distance adjuster are each C-shaped in cross section as a whole, and thus are not in contact with the film 2.

In the exemplary embodiment, the film 2 has the surfaces 2A and 2B similar to those of the first exemplary embodiment, and the tearing strip 21 and the base strip 22 are interposed between the surfaces 2A and 2B. The processing device 1B adjusts the minimum distance d1 between the cutting blade 3A and the receiver base 4A in such a manner as to cut the surface 2A, the tearing strip 21, and the base strip 22, and not to cut the surface 2B, as with the first exemplary embodiment. In contrast, the minimum distance d2 between the cutting blade 3B and the receiver base 4B is adjusted in such a manner as to cut the surface 2B and the base strip 22, and not to cut the surface 2A and the tearing strip 21. Specifically, the minimum distance d2 corresponds to a thickness obtained by adding respective thicknesses of the surface 2A and the tearing strip 21. Thus, in the exemplary embodiment, a first cut formed from the surface 2A side using the cutting blade 3A and the receiver base 4A, and a second cut formed from a side opposite to the first cut using the cutting blade 3B and the receiver base 4B are formed substantially simultaneously by reciprocating motion of the common drive mechanism 5.

In a case where the minimum distance d1 and the minimum distance d2 are adjusted as described above, the cutting blade 3A and the cutting blade 3B overlap with each other in a thickness direction of the film 2 when the cutting blade 3A and the receiver base 4A have moved toward each other to the minimum distance and the cutting blade 3B and the receiver base 4B have moved toward each other to the minimum distance as illustrated in FIG. 5. In this case, the multi-layer structure in which the film 2, the tearing strip 21, and the base strip 22 are overlapped with each other has at least one layer which is cut by both the cutting blade 3A and the cutting blade 3B. In the exemplary embodiment, the base strip 22 is cut by both the cutting blades 3A and 3B.

Figure 6:
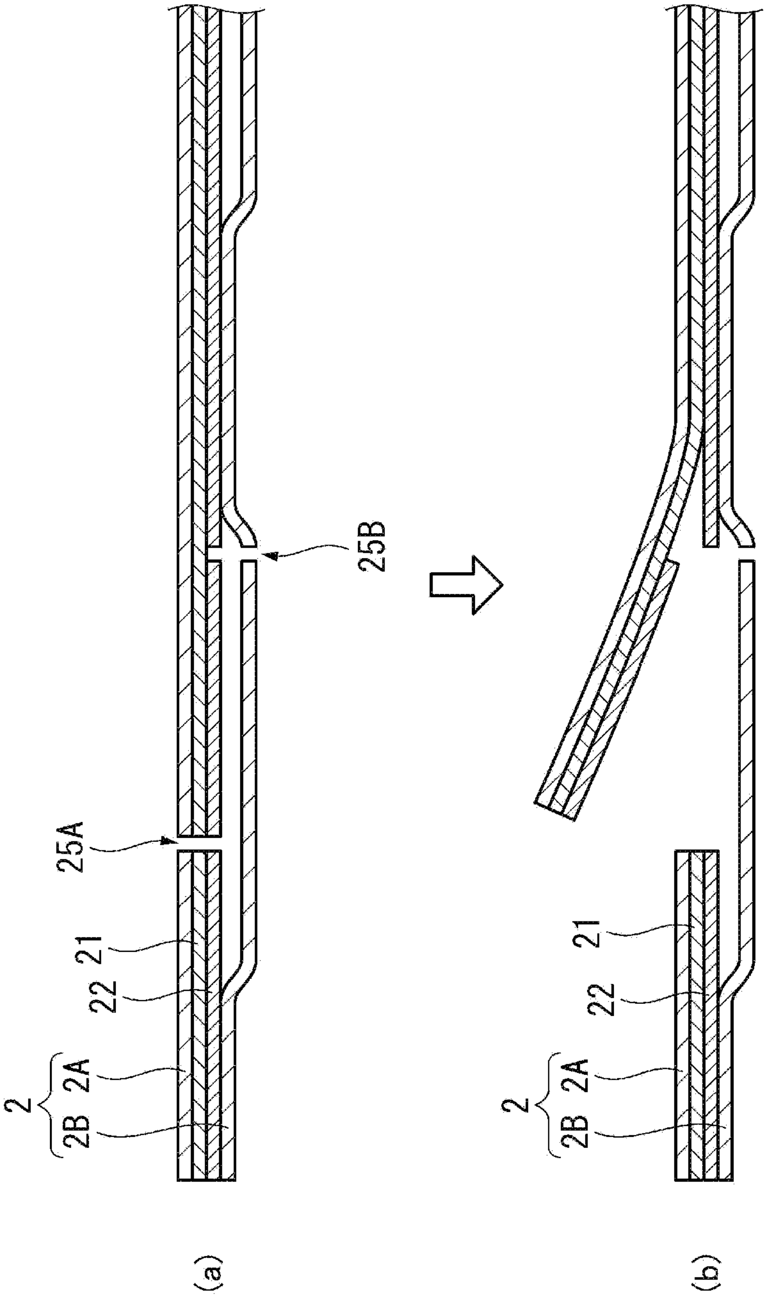
FIG. 6 is a partial cross-sectional view of a bag to be manufactured using a film which has been processed in the second exemplary embodiment of the invention.

FIG. 6 is a partial cross-sectional view of a bag to be manufactured using a film which has been processed in the second exemplary embodiment of the invention. A cross-sectional direction of FIG. 6 is the same as that of FIG. 5; however, FIG. 6 illustrates an unbonded portion as a space. In the exemplary embodiment, the processing device 1B forms the cut 25A from the surface 2A side and a cut 25B from a surface 2B side. The cut 25A is provided as a tab for unsealing. As illustrated in (a) of FIG. 6, the cut 25A passes through the surface 2A, the tearing strip 21, and the base strip 22. Thus, as illustrated in (b) of FIG. 6, the user is able to lift the above-described three layers from the surface 2A side using the tab formed by means of the cut 25A as a starting point. When the user holds and pulls the tab, the cut 25B separates the tearing strip 21 from the base strip 22, and only the surface 2A is torn along the tearing strip 21, thereby unsealing the bag. The bag unsealing structure according to the exemplary embodiment is mostly similar to that of the first exemplary embodiment described above; however, the cut 25B makes it unnecessary to break the base strip 22 and allows the bag to be unsealed with less force.

According to the second exemplary embodiment of the invention described above, the distance adjuster that is not in contact with the film 2 adjusts the minimum distance d1 between the cutting blade 3A and the receiver base 4A and the minimum distance d2 between the cutting blade 3B and the receiver base 4B. In the exemplary embodiment also, the distance adjuster is disposed in such a manner as not to be in contact with the film 2. This makes it possible to reduce abrasion of the cutting blade, and prevents fusion-bonding of the cut due to the heat of the heat sealing. The modifications described above for the first distance adjuster that adjusts the minimum distance d1 between the cutting blade 3A and the receiver base 4A are similarly applicable to the second distance adjuster that adjusts the minimum distance d2 between the cutting blade 3B and the receiver base 4B.

Third Exemplary Embodiment

Figure 7:
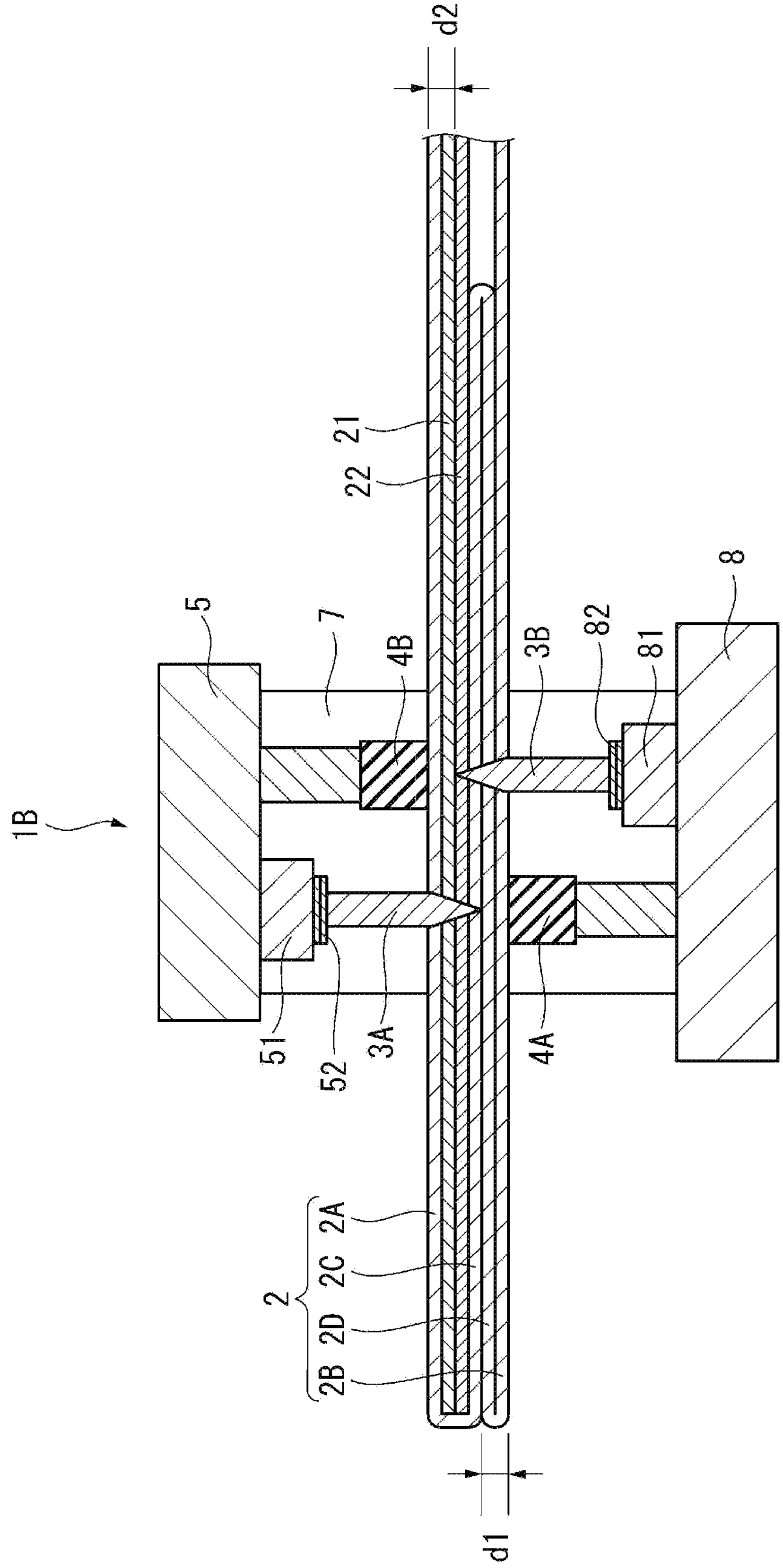
FIG. 7 is a diagram illustrating a schematic configuration of a film processing device according to a third exemplary embodiment of the invention.

FIG. 7 is a diagram illustrating a schematic configuration of a film processing device according to a third exemplary embodiment of the invention. The exemplary embodiment is similar to the above-described second exemplary embodiment except for a configuration of the film 2 and a set value of the minimum distance d1 in the processing device 1B, and thus redundant and detailed description thereof is omitted. In the illustrated example, a bag formed by using the film 2 has a so-called side gusset structure. Specifically, the film 2 has two surfaces 2A and 2B overlapped with each other to configure a front surface and a back surface of the bag, and two surfaces 2C and 2D provided by folding a side portion of the bag. In a portion where the cuts 25A and 25B are formed by the processing device 1B, the surfaces 2A, 2C, 2D, and 2B are overlapped in this order.

In the exemplary embodiment, the processing device 1B adjusts the minimum distance d1 between the cutting blade 3A and the receiver base 4A in such a manner as to cut the surface 2A, the tearing strip 21, the base strip 22, and the surface 2C, and not to cut the surface 2D and the surface 2B. Specifically, the minimum distance d1 corresponds to a thickness obtained by adding respective thicknesses of the surface 2D and the surface 2B. In contrast, the minimum distance d2 between the cutting blade 3B and the receiver base 4B is adjusted in such a manner as to cut the surface 2B, the surface 2D, the surface 2C, and the base strip 22, and not to cut the surface 2A and the tearing strip 21. Specifically, the minimum distance d2 corresponds to a thickness obtained by adding respective thicknesses of the surface 2A and the tearing strip 21. Thus, the processing device 1B is able to form the cut 25A from the surface 2A side and the cut 25B from the surface 2B side. The cut 25A is provided as a tab for unsealing, and the cut 25B facilitates the unsealing as described above.

Figure 8:
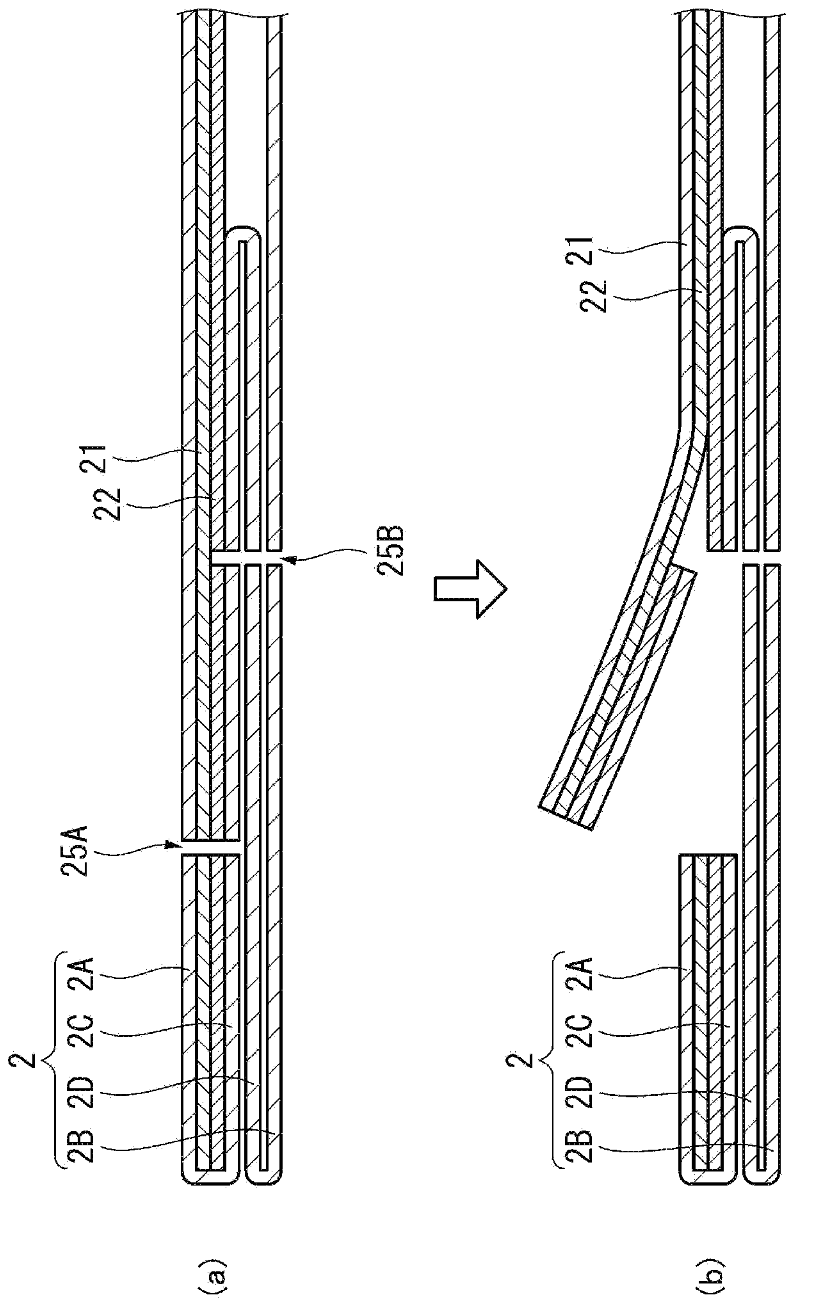
FIG. 8 is a partial cross-sectional view of a bag to be manufactured using a film which has been processed in the third exemplary embodiment of the invention.

FIG. 8 is a partial cross-sectional view of a bag to be manufactured using a film which has been processed in the third exemplary embodiment of the invention. A cross-sectional direction of FIG. 8 is the same as that of FIG. 7; however, FIG. 8 illustrates an unbonded portion as a space. A bag unsealing structure illustrated in (a) of FIG. 8 and (b) of FIG. 8 is mostly similar to that of the second exemplary embodiment, but differs from second exemplary embodiment in that the bag has the side gusset structure. In a case where the surfaces 2C and 2D folded in the side gusset structure are not bonded to each other as illustrated in the figure, it may be difficult to perform unsealing using the tab as a starting point if the cut 25A passes through to the surface 2B side. Accordingly, the configuration according to the exemplary embodiment in which the cutting blade 3A forms the tab as a half-cut may be advantageous. Other advantages and modifications of the exemplary embodiment are similar to those of the second exemplary embodiment described above.

The bag according to the exemplary embodiment may be manufactured as with the example described above referring to FIG. 3 by surrounding a region where the tab is to be formed by means of the cut 25A by the side seal portion 23 and the surrounding seal portion 24. Alternatively, the bag according to the exemplary embodiment may be manufactured by forming a seal portion where the surfaces 2A and 2C of the film 2 are sealed to each other in a portion of the bag including a position where the tab is to be formed, and then forming the cut 25A as the tab and the cut 25B in the seal portion by a processing device 1C.

Preferred exemplary embodiments of the invention have been described above in detail with reference to the accompanying drawings, but the invention is not limited to such exemplary embodiments. It is apparent that a person having ordinary skill in the art of the invention can arrive at various alterations and modifications within the scope of the technical idea recited in the appended claims, and it is understood that such alterations and modifications naturally fall within the technical scope of the invention.

The invention claimed is:

1. A film processing device comprising:

a first cutting blade and a first receiver base that are opposed to each other with a film including at least two layers interposed therebetween, and are configured to move toward and away from each other;

a first distance adjuster that adjusts, without being in contact with the film, a minimum distance between the first cutting blade and the first receiver base;

a second cutting blade and a second receiver base that are opposed to each other with the film interposed therebetween at a position that is different from a position where the first cutting blade and the first receiver base face each other, and are configured to move toward and away from each other; and a second distance adjuster that adjusts, without being in contact with the film, a minimum distance between the second cutting blade and the second receiver base, wherein the second cutting blade and the second receiver base are arranged invertedly from the first cutting blade and the first receiver base with respect to the film.

2. The film processing device according to claim 1, wherein, when the first cutting blade and the first receiver base have moved toward each other to a minimum distance and the second cutting blade and the second receiver base have moved toward each other to a minimum distance, the first cutting blade and the second cutting blade overlap with each other in a thickness direction of the film.

3. The film processing device according to claim 2, wherein the film has a first surface and a second surface that are overlapped with each other, with a tearing strip and a base strip of a zipper tape interposed between the first surface and the second surface, the minimum distance between the first cutting blade and the first receiver base is adjusted in such a manner as to cut the first surface, the tearing strip, and the base strip, and not to cut the second surface, and the minimum distance between the second cutting blade and the second receiver base is adjusted in such a manner as to cut the second surface and the base strip, and not to cut the first surface and the tearing strip.

4. The film processing device according to claim 3, wherein the film further has a third surface and a fourth surface that are folded in between the first surface and the second surface, the tearing strip and the base strip are interposed between the first surface and the third surface, the minimum distance between the first cutting blade and the first receiver base is adjusted in such a manner as to cut the first surface, the tearing strip, the base strip, and the third surface, and not to cut the fourth surface and the second surface, and the minimum distance between the second cutting blade and the second receiver base is adjusted in such a manner as to cut the second surface, the fourth surface, the third surface, and the base strip, and not to cut the first surface and the tearing strip.

5. A bag manufacturing device including the film processing device according to claim 4, the bag manufacturing device further comprising a sealing device that forms a seal portion where the first surface and the third surface are sealed to each other, in a portion of the bag, wherein the first cutting blade and the first receiver base form a tab in the seal portion.

6. The film processing device according to claim 1, wherein the first cutting blade and the second receiver base are attached to a common drive mechanism that is included in the first distance adjuster and in the second distance adjuster, and the first receiver base and the second cutting blade are supported by a table that is included in the first distance adjuster and in the second distance adjuster, the table being on an opposite side of the drive mechanism with the film interposed therebetween.

7. A bag manufacturing device including the film processing device according to claim 1, the bag manufacturing device further comprising a sealing device that forms a seal portion having a surrounding shape where the film is sealed, in a portion of the bag, wherein the first cutting blade and the first receiver base form a tab in a region surrounded by the seal portion.

8. A method for processing a film, the method comprising forming a first cut in a film including at least two layers by using a first cutting blade and a first receiver base, the first cutting blade and the first receiver base being opposed to each other with the film interposed therebetween, and forming a second cut in the film from a side opposite to the first cut by using a second cutting blade and a second receiver base, the second cutting blade and the second receiver base being opposed to each other with the film interposed therebetween at a position that is different from a position where the first cutting blade and the first receiver base face each other, wherein a minimum distance between the first cutting blade and the first receiver base is adjusted by a first distance adjuster which is not in contact with the film, and a minimum distance between the second cutting blade and the second receiver base is adjusted by a second distance adjuster which is not in contact with the film.

9. The method for processing the film according to claim 8, wherein the first cut and the second cut overlap with each other in a thickness direction of the film.

10. The method for processing the film according to claim 9, wherein the film has a first surface and a second surface that are overlapped with each other, with a tearing strip and a base strip of a zipper tape interposed between the first surface and the second surface, the first cut is formed in the first surface, the tearing strip, and the base strip, and is not formed in the second surface, and the second cut is formed in the second surface and the base strip, and is not formed in the first surface and the tearing strip.

11. The method for processing the film according to claim 10, wherein the film further has a third surface and a fourth surface that are folded in between the first surface and the second surface, the tearing strip and the base strip are interposed between the first surface and the third surface, the first cut is formed in the first surface, the tearing strip, the base strip, and the third surface, and is not formed in the fourth surface and the second surface, and the second cut is formed in the second surface, the fourth surface, the third surface, and the base strip, and is not formed in the first surface and the tearing strip.

12. A method for manufacturing a bag including the steps of the method for processing the film according to claim 11, the method for manufacturing the bag further comprising forming a seal portion where the first surface and the third surface are sealed in a portion of the bag, wherein a tab is formed by means of the first cut in the seal portion.

13. The method for processing the film according to claim 8, wherein the first cutting blade and the second receiver base are attached to a common drive mechanism that is included in the first distance adjuster and in the second distance adjuster, and the first cut and the second cut are formed by reciprocating motion of the common drive mechanism.

14. A method for manufacturing a bag including the steps of the method for processing the film according to claim 8, the method for manufacturing the bag further comprising:

forming a tab by means of the first cut in the bag; and forming a seal portion where the film is sealed in a region surrounding the tab.

* * * * *